(12) United States Patent
Ianos

(10) Patent No.: US 7,334,040 B2
(45) Date of Patent: Feb. 19, 2008

(54) METHOD OF TRANSMISSION BETWEEN TWO PROCESSORS OF A RADIO COMMUNICATION UNIT

(75) Inventor: Anca-Marina Ianos, Grenoble (FR)

(73) Assignee: Stmicroelectronics S.A., Montrouge (FR)

( * ) Notice: Subject to any disclaimer, the term of this patent is extended or adjusted under 35 U.S.C. 154(b) by 925 days.

(21) Appl. No.: 10/757,036

(22) Filed: Jan. 14, 2004

(65) Prior Publication Data
US 2005/0086351 A1    Apr. 21, 2005

(30) Foreign Application Priority Data
Jan. 17, 2003   (FR) .................................. 03 00516

(51) Int. Cl.
*G06F 15/16*    (2006.01)
(52) U.S. Cl. ...................... 709/230; 709/200; 709/236
(58) Field of Classification Search ........ 709/200–203, 709/230–232, 236–237, 250; 370/912–913; 719/311
See application file for complete search history.

(56) References Cited

U.S. PATENT DOCUMENTS 6,014,705 A * 1/2000 Koenck et al. ............. 709/230
6,567,845 B1 * 5/2003 Chatani ....................... 709/208
6,714,983 B1 * 3/2004 Koenck et al. ............. 709/230
6,915,436 B1 * 7/2005 Booth et al. ................ 709/231
7,155,256 B2 * 12/2006 Shimizu et al. ............. 455/561

OTHER PUBLICATIONS

Okura, H. et al: "The effect of segmentation mismatch on quality of continuous media transmission by Bluetooth", IEEE PIMCR 2002, vol. 2, Sep. 15, 2002, pp. 702-709, XP010614316.
Varada, S. et al: "Data flow and buffer management in multi-channel data link controller", Local Computer Networks, 1999. LCN '99. Conference on Lowell, MA, USA Oct. 18-20, 1999, Los Alamitos, CA, USA, IEEE Comput. Soc, US. Oct. 18, 1999, pp. 132-.
French Search Report, FR 0300516, dated Oct. 29, 2003.

\* cited by examiner

*Primary Examiner*—Bharat Barot
(74) *Attorney, Agent, or Firm*—Gardere Wynne Sewell LLP

(57) ABSTRACT

Two processors are provided within a radio communication unit and linked together by a connection internal to the unit comprises. A process is effectuated for detecting transmission errors between the two processors. Codes transmitted between the processors are apportioned into frames which include indicators written by the processor sending the frames. On reception of the frames, the indicators are used by the receiving processor to validate the frames received. The codes transmitted may correspond to information contained in packets. The information of a packet that is intended to be transmitted via the internal connection may be placed in a single frame associated with the packet.

40 Claims, 6 Drawing Sheets

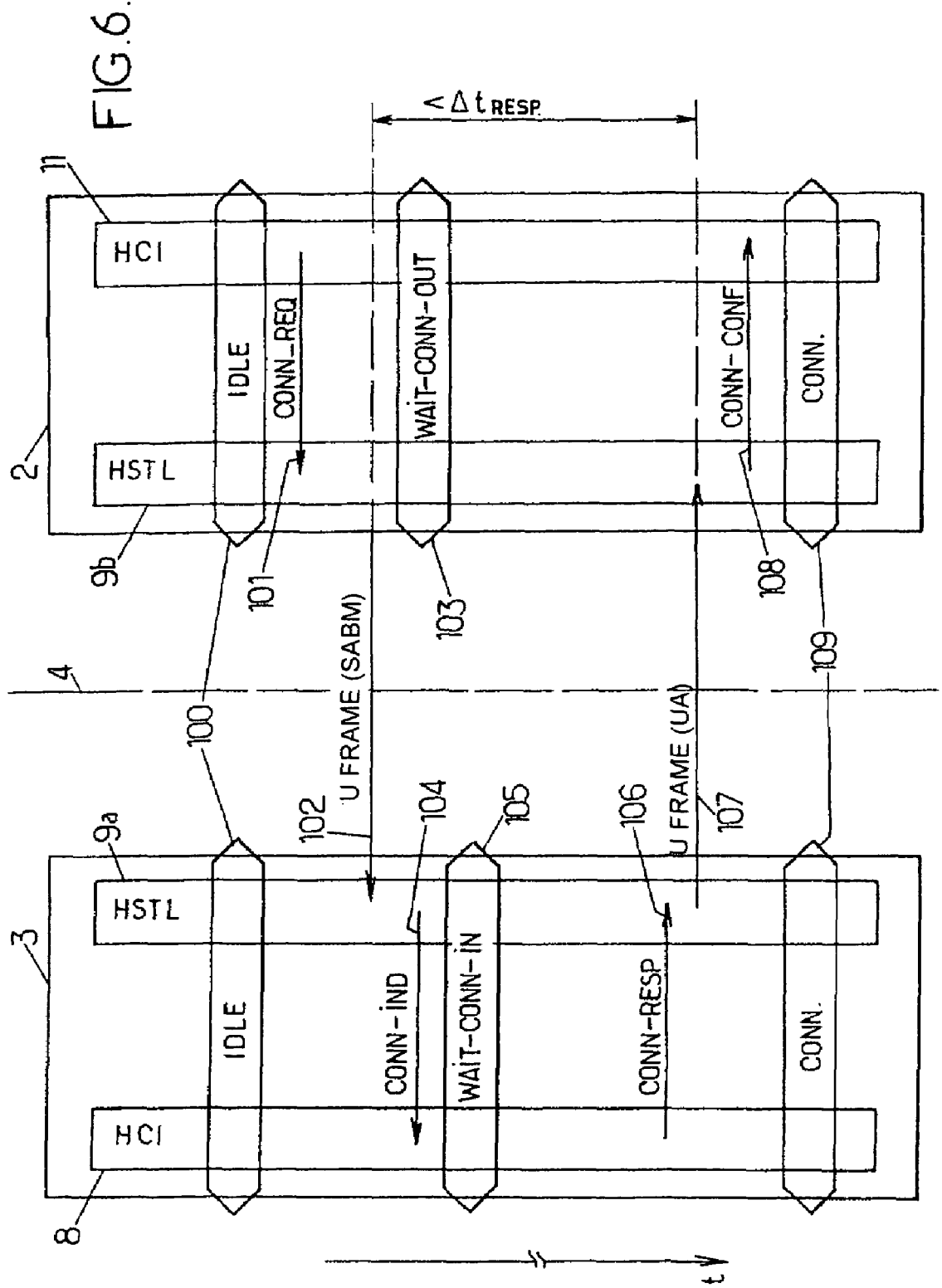

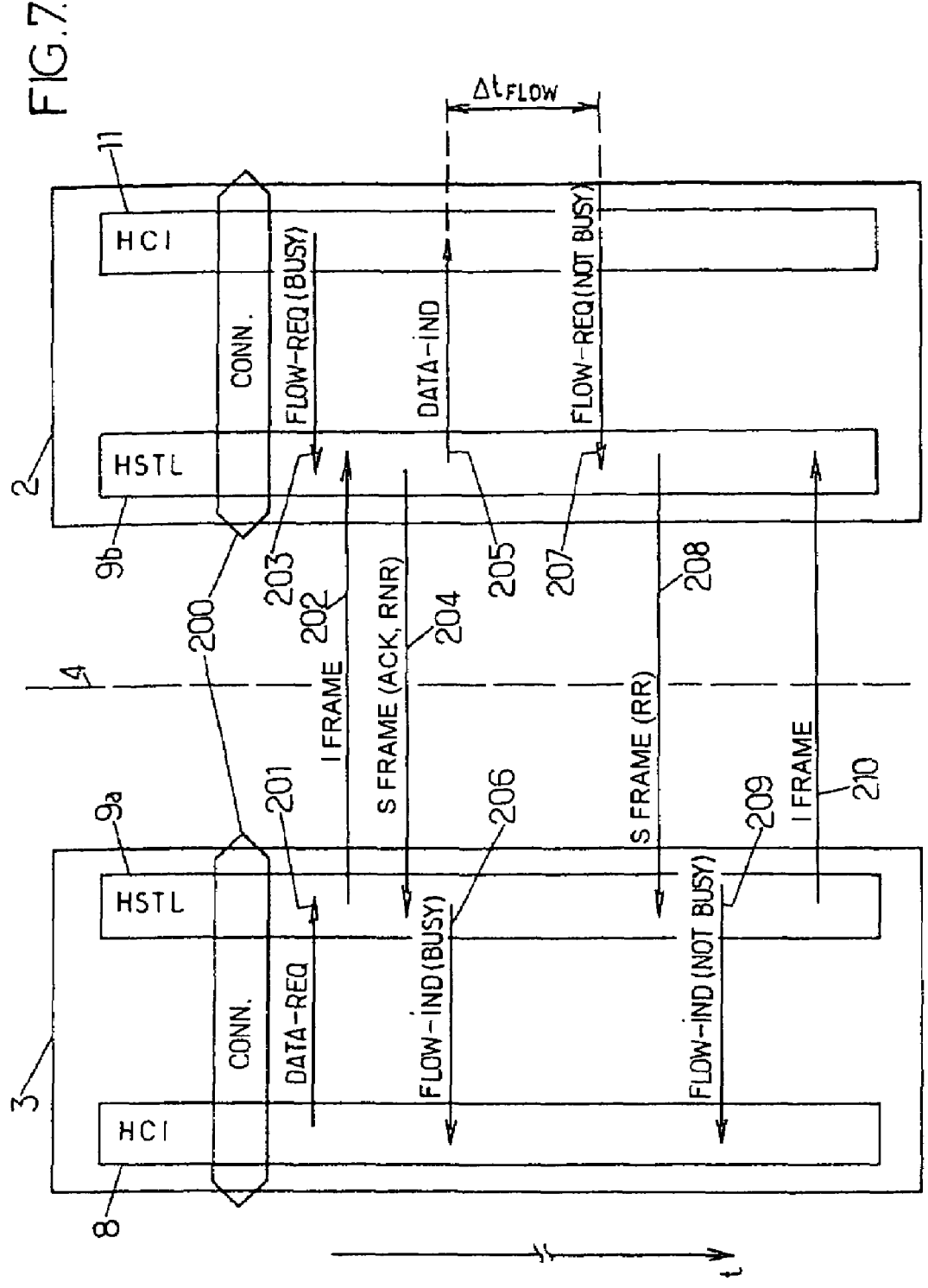

METHOD OF TRANSMISSION BETWEEN TWO PROCESSORS OF A RADIO COMMUNICATION UNIT

PRIORITY CLAIM

The present application claims priority from French Application for Patent No. 03 00516 filed Jan. 17, 2003, the disclosure of which is hereby incorporated by reference.

BACKGROUND OF THE INVENTION

1. Technical Field of the Invention

The present invention relates to a method of transmission within a radio communication unit comprising two processors linked together by a connection internal to the radio communication unit.

2. Description of Related Art

The expression "radio communication unit" is understood to mean a device capable of exchanging data with other devices equipped with radio sending and receiving means compatible with those of said unit. Such a unit may, for example, be a computing unit, a games console, a keyboard, a display screen, a printer, a home automation appliance, a communication terminal, etc. Each of these units contains at least one package program or application, making it possible in particular for this unit to fulfill its main function, namely data processing in respect of a computing unit or a games console, data entry in respect of a keyboard, data display in respect of a screen, printing in respect of a printer, etc.

It is often advantageous to apportion, within the communication unit, the functions executed by this unit between two processors linked together by an internal connection.

The first processor may be specially adapted to the main function of the unit. To do this, it may comprise means specifically appropriate for the execution of the application corresponding to this function, such as particular memory elements or a specific controller of interfaces for entering inputs and/or for presenting data to a user of the unit.

The second processor may execute operations, so-called low-level operations, necessary for transmitting the data between this radio communication unit and an outside device. In addition to the control of a radio transceiver, it configures the data in a form adapted to their transmission by radio, such as, for example, an apportioning of the data into successively transmitted packets. Conversely, it groups together data of packets received successively by radio, which correspond to one and the same communication session.

Such a second processor may be of a model common to all the communication units that use one and the same mode of radio transmission. This results in a reduction in the cost of the second processor, through a scale effect during its manufacture. On the other hand, this second processor may be associated in one and the same unit with a first processor of a model that varies as a function of the main application intended to be executed in this unit. A specialization of each communication unit is thus obtained, while benefiting from the cost reduction related to a single model of second processor.

Such a radio communication unit structure, having two processors linked together by an internal connection, is considered herein below.

The radio signals sent or received by the unit cause interference of electromagnetic nature which may disturb the transmissions performed via the internal connection between the two processors. Transmission errors then appear during the deciphering of the codes transmitted via the internal connection.

Interference of other origins may also disturb the transmission of the codes between the two processors, such as, in particular, electric microdischarges arising at the level of the internal connection. A particularly low "signal-to-noise" ratio may consequently be observed on the internal connection.

For a unit powered by an autonomous energy source, of cells or batteries type, it is known to momentarily interrupt operation of one of the two processors so as to reduce the energy consumption of the unit. This processor resumes its operation only when it is invoked, in particular when it receives codes via the internal connection originating from the other processor. This resumption of operation often requires a rebooting time interval, even a short one, during which codes received via the internal connection may be lost or spoilt by errors.

Errors of transmission between the two processors give rise subsequently to defective operations executed by the application or communication faults between the units linked by radio.

Several modes of communication between two processors have already been developed, which are in particular aimed at reducing the transmission errors. Each of these modes is more specifically adapted to a particular type of communication interface. Most of them comply with the HDLC norm ("High-level Data Link Control" established by the International Standard Organization in 1976 (see for example ISO/IEC 13239-1997)), or are derived from this standard by introducing simplified or complementary procedures adapted to particular types of communication interface. Each mode of communication thus designed employs certain frame types defined by the HDLC standard, assigning them specifically to specified categories of messages. Among these modes of communication may be cited:

the PPP protocol ("Point-to-Point Protocol", see for example IETF—Request for Comments 1134) used for modems for linking to a telephone network. The PPP protocol provides in particular for the periodic introduction of null bits so as to avoid confusion between data bits and control bits;

the GSM protocol ("Global System for Mobile communications," see GSM 07.10 Technical Specification 101 369 V6.3.0 published by the ETSI—March 1999) particularly adapted for carrying out multiplexing of several applications hosted in a mobile communication unit;

the HCI RS232 protocol, known to the person skilled in the art, used for communication between a host processor and at least one application and a radio communication processor that are internal to a Bluetooth™ communication unit. This protocol is used very little on account of its complexity; and finally the B-ISDN protocol ("Broadband Integrated Services Digital Network," see ITU-T Recommendation I.365.4—1996) which proposes a correspondence between AAL 5 frames of CPCS type ("Common Part Convergence Sublayer") and frames of the HDLC standard.

These various modes of communication are poorly adapted for transmission of data between two processors of one and the same radio communication unit. Indeed, they are complex, without such complexity being necessary, and do not afford sufficient security of the data transmitted.

A need accordingly exists for a simple and effective method of securing the data transmitted between two processors of a radio communication unit.

SUMMARY OF THE INVENTION

The invention consequently relates to a method of transmission between two processors arranged inside a radio communication unit and linked together by a connection internal to the radio communication unit. The first processor executes at least one application and the second processor executes radio communication operations between said unit and outside communication units. According to the invention, the method comprises the following steps:

apportioning of codes by one of the two processors, the sender of said codes, into frames having respective lengths;

writing of elements by the sending processor into dedicated fields of each frame, among which elements:
  the length of the frame,
  a value of an indicator of transmission error determined by the sending processor on the basis of certain at least of the codes placed in the frame, and
  a start of frame indicator and an end of frame indicator;

transmission of the frames by the internal connection;

for each frame, verification by the other processor, the receiver of said codes:
  of the identity between the length of the frame received and the length written,
  of the identity between the written value of the error indicator and a value of this error indicator as determined by the receiving processor on the basis of certain at least of the codes received in the frame, and
  of the presence of the start and end of frame indicators;

in the case of positive verifications, production by the receiving processor of an acknowledgement message dispatched to the sending processor by the internal connection.

Thus, according to the invention, the method of transmission between the two processors via the internal connection combines several arrangements for detecting transmission errors. A processor that receives codes for which it detects a transmission error may either ignore these codes, or request a new transmission of the same codes. In both cases, the erroneous codes do not cause defective operation of the receiving processor.

Optionally, the validation by the receiving processor of a frame received may be supplemented with a condition of separation of the successive frames. For example, the receiving processor may verify that the start indicator of a new frame is received after a specified separation time interval from the reception of the end indicator of the last frame previously received. Better security of the transmission between the two processors is thus obtained.

The method of transmission of the invention may furthermore afford the following functions:

setting up of a communication between the two processors,
verification of the state of the communication link between the two processors,
control and supervision of a communication in progress,
priority transmission of certain information, and
interruption of a communication instructed by any one of the two processors.

To do this, frames transmitted between the two processors via the connection internal to the radio communication unit may be associated with primitives produced within each processor. In particular, a frame may be sent in response to a primitive of a first type produced within the sending processor, and a primitive of a second type may be produced within the receiving processor in response to the reception of a frame. A continuous relay of control and of information may thus be established between a final application executed by the package processor and a module of the radio communication processor.

In particular, a frame containing codes for requesting end of transmission may be sent by any one of the two processors prior to an interruption of operation of this processor. Such an interruption may be motivated by a saving of energy for powering the unit, when no transmission of information has occurred between the two processors for a duration greater than a predefined duration. Optionally, certain codes for requesting the end of transmission may indicate the state of the processor sending the request frame after the interruption of operation of the sending processor. The processor receiving the request is then informed of the state of the processor sending the request, thereby making it possible to adapt conditions of a subsequent resumption of a transmission between the two processors, so as to reduce any loss of codes at the start of the new transmission.

In a preferred implementation of the method of the invention, the codes correspond to information contained in packets. The sending processor apportions the codes corresponding to the information of a packet into a single frame associated with said packet. A one-to-one correspondence is then established between the frames and the packets, allowing sequential and separate processing of the packets for their transmission via the internal connection. Said packets may, in particular, be data packets or signaling packets.

Furthermore, frames of distinct predefined types may be associated with the packets as a function of the type of each packet. Thus a frame associated with a data packet may be of a different type from that of a frame associated with a signaling packet, for example. It is thus possible to adapt the processing of each frame as a function of the type of information that it transports.

The invention also relates to a processor comprising an interface for connecting another processor adapted for the implementation of a method of transmission as described above. Such a processor comprises in particular:

means for producing frames containing codes apportioned into specified fields;
means for determining the value of a transmission error indicator on the basis of certain at least of the codes placed in a frame;
means for writing elements into dedicated fields of each frame, among which elements:
  the length of the frame,
  the value of the error indicator determined for the frame,
  a start of frame indicator and an end of frame indicator;
means for sending frames via said interface;
means for receiving frames via said interface;
means for measuring the length of a frame received;
means for verification in a frame received:
  of the identity between the length measured of the frame received and the length written,
  of the identity between the written value of the error indicator in the frame received and a value of this error indicator as determined on the basis of certain at least of the codes received in the frame,
  of the presence of the start and end of frame indicators;
means for producing acknowledgement messages devised so as to dispatch an acknowledgement message via said interface in response to a frame received validated by the verification means.

The processor may furthermore comprise means for measuring the duration between the reception of the start indicator of a new frame and the reception of the end indicator of the last frame previously received, as well as means for verifying that said duration is greater than a specified separation time interval.

Such a processor may additionally host at least one application to which certain data transmitted by the method of the invention is intended. In this case, the processor comprises means for executing this application, means for processing according to said application of information corresponding to a part of the codes contained in frames received via said interface, and means for producing codes to be apportioned into frames using the information produced by the application.

A processor according to the invention may also be a radio communication unit's control processor. It then furthermore comprises means for executing operations of radio communication with outside radio units, means for producing radio signals transmitted using a part of the codes contained in frames received via said interface, and means for producing codes to be apportioned into frames using the radio signals received.

The invention further relates to a radio communication unit which comprises a host processor for an application and a control processor of the radio communication unit as are described previously. The two processors are linked together at the level of their respective interfaces by a connection internal to the radio communication unit. Optionally, such a unit may be powered by a standalone energy source, such as a rechargeable battery or cells.

The invention furthermore relates to a radio communication system comprising such a radio communication unit.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 6 illustrates various sequences of a procedure for setting up a communication according to the invention;

FIG. 7 illustrates various sequences of a stream control procedure for a transmission according to the invention.

DETAILED DESCRIPTION OF THE DRAWINGS

The invention is now described in detail for a transmission network in accordance with the "Bluetooth™" standard, known to the person skilled in the art. In such a network, the data are transmitted by radio using the 2400-2483.5 MHz frequency band, in the form of data packets having specified structures and/or formats.

Figure 1:
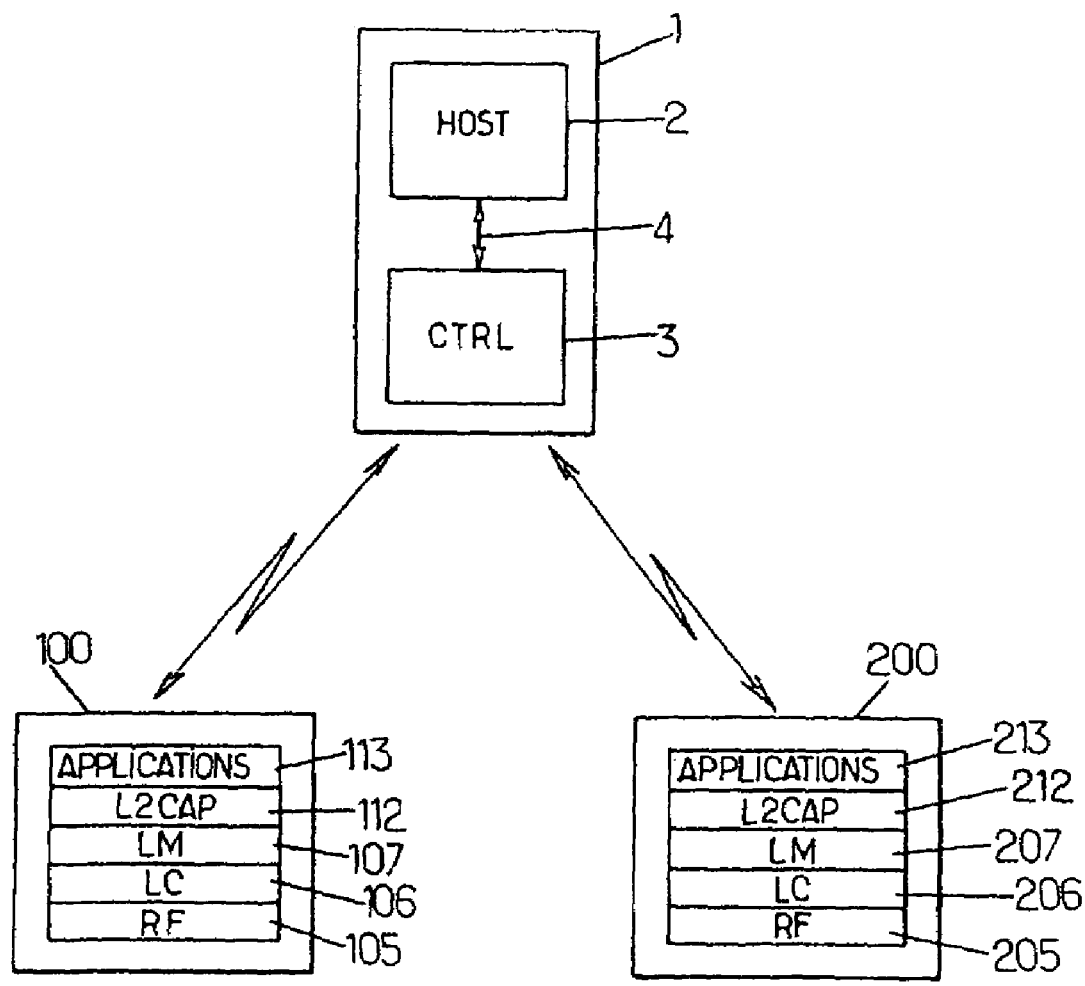
FIG. 1 represents a local area network to which the invention applies.

FIG. 1 represents three units of one and the same local area network, among which the unit 1 fulfills, for example, a master function. The units 100 and 200 are then slaves of the unit 1. Each unit 1, 100, 200 may be of varied type, such as, for example, a computing unit, a games console, a keyboard, a display screen, a printer, a home automation appliance, a communication terminal, etc.

This unit contains at least one package program or application, allowing it in particular to fulfill its main function, namely data processing in respect of a computing unit or a games console, data entry in respect of a keyboard, data display in respect of a screen, printing in respect of a printer, etc.

In standard fashion, each unit is designed according to a stack of protocols allowing it to exchange data in a manner compatible with the other units of the local area network. Among these protocols may feature, for example:

an RF send and receive command protocol, corresponding to the layers 105 and 205 respectively for the units 100 and 200;

a protocol for executing low-layer operations, such as the "Link Controller" (or LC) protocol and corresponding to the layers 106 and 206 for the units 100 and 200;

a protocol for initializing and managing the communications between the units of the local area network corresponding to layers 107 and 207, such as, for example, the "Link Manager" (or LM) protocol;

a protocol for multiplexing the signals intended, in particular, for different applications residing simultaneously in certain of the units of the local area network. This may be the "Logical Link Control and Adaptation Protocol" (or L2CAP) protocol. The layers 112 and 212 of the L2CAP protocol provide, in particular, for the shaping of packets of data to be transmitted by radio, or, conversely, to the grouping together of data received by radio into successive packets; and at least one application 113, 213 residing in each unit 100, 200. These applications are the final destinations of the data exchanged within the local area network. Several units exchanging data relating to a specified application may each contain a program of this application so as to produce, interpret and process the data exchanged within the context of this application.

Two structures are possible for each radio communication unit. According to one of these structures, designated as "embedded," the operations of all the protocols cited previously as well as the operations of the applications are executed in a single processor of the unit. The units 100 and 200 of FIG. 1 possess this structure.

Figure 2:
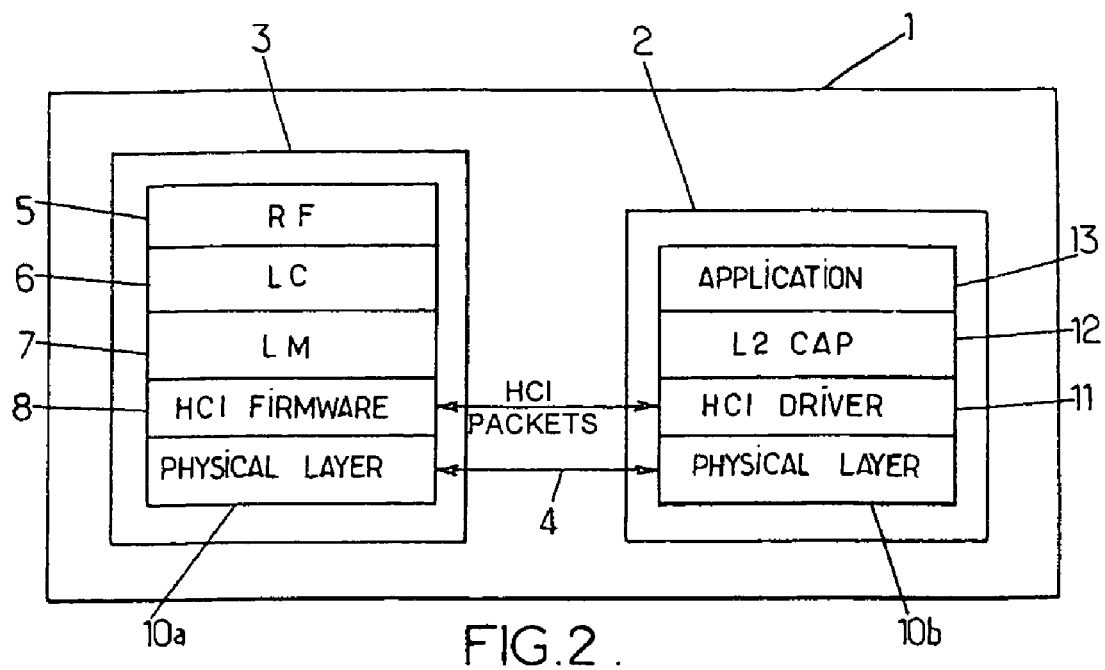
FIG. 2 illustrates an architecture of protocols according to the prior art of a radio communication unit to which the invention applies.

For the implementation of the invention, the unit 1 possesses a different structure, with two processors, known to the person skilled in the art and depicted in detail in FIG. 2. A first processor 2, called the host, hosts at least one application 13 supported by the unit 1, as well as the L2CAP protocol 12. A second processor 3, the so-called controller processor or CTRL, hosts the lower layers corresponding to the operations relating to radio transmission, namely layers 5, 6, and 7 (RF, LC and LM protocols).

In this structure with two processors, the processors 2 and 3 are connected together to exchange data through a connection 4 internal to the unit 1. This connection 4 may be of various types, such as, for example, a USB ("Universal Serial Bus") connection, a UART ("Universal Asynchronous Receiver Transceiver") connection or a memory module with two DPRAM ("Dual Port Random Access Memory") inputs. It links respective data exchange interfaces of the processors 2 and 3, associated with the physical layers 10a and 10b within each processor.

Two layers 8 and 11 of an additional protocol, which may be the "Host Controller Interface" (or HCI) protocol, provide within each processor 2, 3 for the shaping and the re-establishing of the data exchanged via the connection 4. The layer 8 carried by the control processor 3 is called "HCI firmware" and the layer 11 carried by the host processor 2 is called "HCI driver." The data exchanged via the connection 4 are apportioned into specific data packets processed by layers 8 and 11, called HCI packets.

Figure 3:
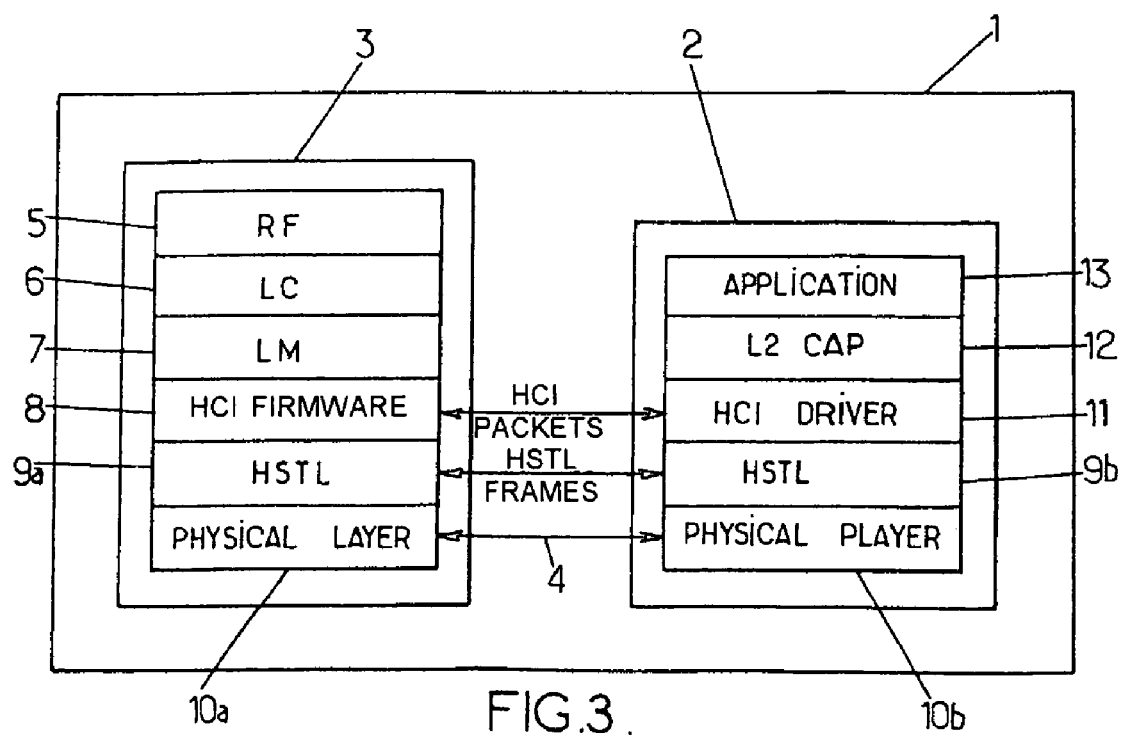
FIG. 3 illustrates the architecture of protocols of a radio communication unit according to the present invention.

FIG. 3 is a repeat of FIG. 2, supplemented with the specific means for implementation of the invention. The stack of protocols corresponding to each of the two processors 2 and 3 is supplemented with an additional protocol layer. This layer, of transport level, is dubbed HSTL ("HCI Secure Transport Layer") subsequently. Its implementation within the processor 2 corresponds to the reference 9b. It is interposed between the physical layer 10b and the "HCI driver" layer 11. Just as for the control processor 3, the HSTL layer 9a is interposed between the physical layer 10a and the "HCI firmware" layer 8. In contradistinction to layers 8 and 11, each of which possesses specific characters associated with the processor 2 or the processor 3, the functions of the HSTL layers 9a and 9b may be identical for the two processors 2 and 3. The modules dedicated respectively to the execution of the functions of the HSTL layers 9b and 9a in the processors 2 and 3 may then be identical.

According to the implementation of the invention described, each HCI packet produced according to the "HCI firmware" layer 8 of the control processor 3 is encapsulated according to the HSTL layer 9a in a HSTL frame dedicated to this HCI packet. This HSTL frame is transmitted via the connection 4 destined for the host processor 2. Upon receipt of this frame by the host processor 2, the HSTL layer 9b makes it possible to restore the initial HCI packet and transmit it so as to be processed according to the "HCI driver" layer 11.

Conversely, an HCI packet produced by the "HCI driver" layer 11 of the host processor 2 and transmitted to the control processor 3 is encapsulated in a similar manner in an HSTL frame of the layer 9b. After the transmission of the HSTL frame via the connection 4, the HCI packet is restored at the level of the HSTL layer 9a. It is then transmitted so as to be processed according to the "HCI firmware" layer 8 of the control processor 3.

Figures 4, 5:
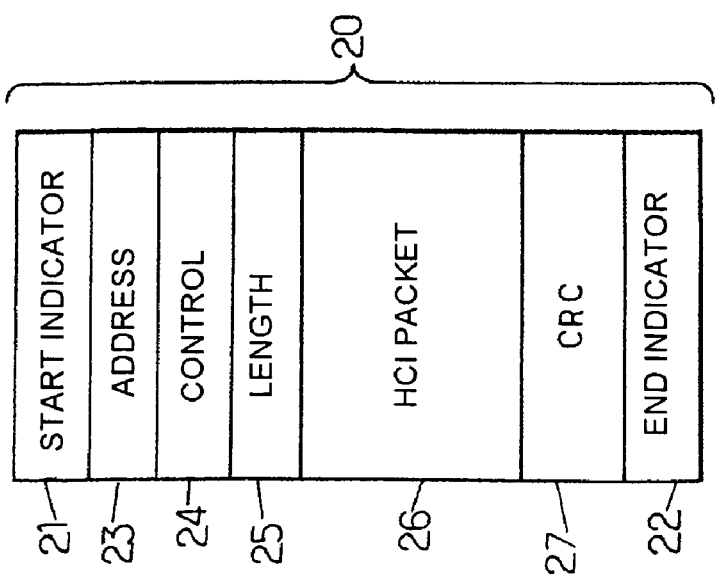
FIG. 4 illustrates the general structure of a frame used in the method of the invention.
FIG. 5 is a table of structures of control fields for three types of frames.

FIG. 4 represents the structure of an HSTL frame used in the invention. The reference 20 designates such an HSTL frame which corresponds to the specifications of the HDLC standard and which comprises the following fields:

two fields 21 and 22 intended for respectively receiving a start of frame indicator and an end of frame indicator that are written by the sending processor before the sending of the frame;

an address field 23, of one byte for example, used in the manner prescribed by the HDLC standard;

a control field 24, of one byte for example, whose content is made explicit later;

a length field 25, of one byte for example, intended for receiving an indication of length of the frame written by the sending processor;

a field 26 of variable length in which the sending processor can write data intended to be transmitted between the two processors; and a field 27, for example of two bytes, which is intended for the detection of transmission errors and is sometimes called CRC (standing for "Cyclic Redundancy Check").

For an application of the invention in the context of a Bluetooth communication system, as considered here, the data field 26 is intended to receive an HCI packet emanating from layer 8 or 11 of the HCI protocol, respectively from the processor 3 or 2 sending the frame 20.

FIG. 5 indicates the content of the control field 24 for three distinct types of frames of the HDLC protocol employed in the present invention. These frame types are designated by I ("Information"), S ("Supervision") and U ("Unnumbered"). The type of the HSTL frame associated with an HCI packet intended to be transmitted between the two processors via the connection 4 is determined as a function of the type of the HCI packet. According to the described implementation of the invention, an I frame is used for the transmission of an HCI data packet transporting information intended for the application 13 or emanating from this application (ACL data), or HCI control data ("HCI commands/events"). A U frame is used for the management of the HSTL communication or for packets transporting voice ("SCO data"). The subset of U frames used for the management of the HSTL communication groups together the SABM, UA, DISC and DM frames, and UI frames are used for the packets transporting voice. Finally, an S frame is used to send a message for supervising a transmission via the connection 4. Such a supervising message comes under the HSTL protocol. The S frames comprise no data field 26. The subset of the S frames adopted is RR and RNR.

The type of the frame is indicated by means for a distinguishing code by the bits 0 and 1 of the control field 24, that are situated on the right in FIG. 5. By way of example, bit 0, when it contains the value 0, is sufficient to indicate the I frame type. The S and U frame types correspond to a value 1 of the bit 0, and are distinguished from one another by the value of bit 1. Each processor 2, 3 comprises means for thus writing the type of each frame into its control field 24.

For the three types of frames I, U and S, bit 4 indicates whether the frame requires a response on the part of the receiving processor or does not require one (P/F bit).

Bits 1, 2 and 3 of an I frame indicate the index number of this frame in a sequence of successive I frames, and bits 5, 6 and 7 indicate the index number of the next I frame in the sequence.

For an S frame, bits 5, 6 and 7 also indicate the index number of the next I frame of a sequence currently being transmitted, and bits 2 and 3 are reserved for a code for supervising the communication between the two processors 2 and 3.

The U frames are not numbered, and the thus available bits 2, 3, 5, 6 and 7 of a U frame are reserved for signaling information.

Various exemplary uses of the I, S and U frames according to the method of transmission of the invention are now described.

For the application of the invention to a Bluetooth communication unit, the data intended to be transmitted between the two processors 2 and 3 are presented to the HSTL layer in the form of HCI data packets, in compliance with the protocol layers 8 and 11. Each HCI data packet is placed in the data field 26 of a frame 20 of I type. Prior to the sending of the frame via the connection 4, the sending processor then fills in the start and end of frame indicator fields 21 and 22, addressing field 23, control field 24, length field 25 and transmission error indicator field 27. The transmission error indicator value written into the field 27 is determined on the basis of part of the content of the frame to be transmitted by appropriate means for implementation of the HSTL protocol. According to a particular implementation, the value of the indicator is calculated as a remainder after dividing a polynomial constructed on the basis of certain at least of the codes contained in the frame by a generating polynomial. If the generating polynomial used is of degree 16, the written value of the error indicator occupies the two bytes of the field 27.

Upon receipt of the frame, the receiving processor re-evaluates the length of the frame and the error indicator on the basis of the content of the frame received. The length of the frame received must be greater than five bytes, corresponding to the address field 23, to the control field 24, to the length field 25 and to the transmission error indicator field 27 (two bytes). It compares the length found with the value written in the length field 25, and the error indicator value found with the value written in the field 27. A transmission error pertaining to a bit or a bigger part of the frame is detected when one at least of the two values determined on receipt of the frame differs from the corresponding value written in the frame. The receiving processor is thus alerted of the presence of a transmission error and must ignore the frame. The acknowledgement is not dispatched to the sending processor.

Optionally, the receiving processor can furthermore proceed to a test of separation of the frames received. Such a test consists in verifying that the reception of the start indicator of a second frame following a first frame is separated from the reception of the end indicator of the first frame by a duration greater than a specified time interval. This minimum time interval of separation of the frame may correspond, for example, to the time required for the transmission of four successive bytes. Such a separation makes it possible to guarantee sequential processing of the frames received successively by each processor, while avoiding congestion of the circuits for processing the frames received. If a frame follows a previous frame too closely, it must be ignored by the receiving processor.

When the previous tests validate a frame received, the processor receiving the frame returns an acknowledgement message to the sending processor via the connection 4. This acknowledgement message may be the subject of a specific frame of S type, or else may be grouped into a frame of I type conveying other data transmitted by the processor receiving the first I frame to the sending processor.

The processor receiving the first I frame proceeds to the extraction of the HCI packets from the data field 26. The HCI packet extracted is then processed by the receiving processor in compliance with the HCI protocol.

The method of transmission of the invention can be enhanced according to the following two improvements:

when a frame of I type has been dispatched by one of the two processors to the other, and when the processor sending this I frame does not receive any acknowledgement message in return, it can repeat the dispatching of the I frame after a current standby time interval commencing from the dispatching of the I frame. The I frame can be dispatched repeatedly if no acknowledgement message is received, up to a maximum number of dispatchings of one and the same frame. The standby time interval before repetition of the dispatching of a frame as well as the maximum number of repetitions of the dispatching of one and the same frame may be adjustable parameters of an advanced mode of transmission;

several logical transmission channels having different transmission characteristics may be available. The channel used for a specified communication is then fixed during the setting up of this communication. Characteristics of particular channels may be, by way of examples: priority of the frames transmitted by a channel relative to the frames transmitted by other channels, certain channels more specifically adapted for the transmission of data or of voice signals, or else channels reserved for the transmission of certain types of HCI packets. Thus a particular channel may be specially dedicated to HCI control packets, or I frames associated with a high level of priority are used for the HCI control packets, whereas I frames associated with a lower level of priority are used for HCI packets of application related data.

The use according to the invention of the U frames is now described in detail within the context of the setting up of a communication between the processors 2 and 3. The setting up of a communication is considered only by way of exemplary use of the U frames, it being understood that the U frames may also be used for the transmission between the processors 2 and 3 of packets transporting voice (UI frames).

The setting up of a new communication may be required by the processor 2 or by the processor 3. According to the procedure illustrated by FIG. 6, the communication is requested by the host processor 2 from the control processor 3. The communication may in particular be requested by the application 13 hosted by the processor 2. FIG. 6 is a chronological chart of the setup procedure for a communication, with reference to the time axis t oriented upwards in the Figure. Initially, the two processors 2 and 3 are in an idle state ("IDLE"), in compliance with the state indication 100 of each processor. A connection request primitive 101 ("CONN_REQ") is produced within the processor 2, at the level of layer 11 of the HCI protocol. In response to this primitive 101, the processor 2 produces, according to the HSTL protocol (layer 9b), a frame of U type, referenced 102 in FIG. 6. Into this frame it writes an "Asynchronous Balanced Mode" type connection setup command known to the person skilled in the art (SABM command, the initials standing for "Set Asynchronous Balanced Mode"). The SABM command is specified by bits 2, 3, 5, 6 and 7 of the control field 24 of the U frame. Bit 4 of the U frame indicates that the processor 2 is standing by waiting for a response from the processor 3. Such a connection request frame U may be devoid of any data field 26. The frame 102 is dispatched via the connection 4 to the processor 3, and the processor 2 places itself in a standby state 103 awaiting communication setup ("WAIT_CONN_OUT").

Upon receipt of the frame 102, the SABM command is read by the processor 3 which produces a connection indication primitive 104 ("CONN_IND") at the level of layer 9a of the HSTL protocol. The processor 3 then in its turn places itself in a standby state awaiting communication setup ("WAIT_CONN_IN"), indicated by the reference 105.

When the processor 3 is ready for communication setup, a connection response primitive 106 ("CONN_RESP") is produced within the processor 3, according to the HCI protocol of layer 8. The processor 3 then produces, according to the HSTL protocol of layer 9a, a new frame 107 of U type comprising an acknowledgement ("UA" standing for "Unnumbered Acknowledgement") indicated by bits 2, 3, 5, 6 and 7 of the control field 24. Bit 4 of this new U frame does not require any response. The processor 3 then places itself in a connected state 109.

On receipt of the frame 107, the processor 2 reads the acknowledgement message UA in compliance with the HSTL protocol and produces a connection confirmation primitive 108 ("CONN_CONF"). The primitive 108 is processed in compliance with the HCI protocol (layer 11) and the processor 2 in turn places itself in the connected state 109.

Just as for the previously described transmission of I frames, a standby time interval may be defined, which limits the duration $\Delta t_{RESP}$ between the sending of the frame 102 and the receiving of the frame 107 by the processor requesting the communication setup. When this time interval is attained, the processor on the initiative of the communication setup request may repeat the frame 102, up to a fixed maximum number of repetitions. When this number is attained, a failure of communication setup is definitively declared.

In the case where the method of transmission of the invention is implemented with separate and independent transmission pathways for the two directions of transmission between the processors 2 and 3 ("full duplex"), the two processors may simultaneously request the setting up of a communication. Such a situation is commonly regarded as a collision of requests. The two requests are then satisfied.

A similar procedure of interrupting a communication between the two processors can be implemented using the method of the invention. This procedure brings the two processors from the connected state ("CONN") to the idle state ("IDLE"), passing via an intermediate standby state awaiting disconnection. The interruption of communication is requested by one of the two processors by transmitting to the other processor via the connection 4 a first U frame of the HSTL protocol containing a disconnection command. The processor receiving this first U frame then returns a second U frame which confirms the disconnection.

Such a procedure for interrupting communication may in particular be implemented before one at least of the two processors switches to idle mode, for example so as to decrease its energy consumption during an inactivity period. It may also be implemented following a malfunction of one of the two processors, or following the detection of a systematic transmission error by the connection 4. Once the communication has been interrupted, each processor is thus aware of the state of activity or of inactivity of the other processor. It can then adapt the conditions of setup of a new communication so as to reduce the time interval thereof and decrease the risk of information loss at the start of a new communication.

The use according to the invention of S frames dedicated to the supervising of a communication is now described within the context of control of the transmission stream between the two processors 2 and 3, with reference to FIG. 7. The structure of FIG. 7 is similar to that of FIG. 6, the time axis t being again oriented upwards in the Figure. The two processors are initially in a connected state (reference 200 in FIG. 7): a transmission 202 of I frames is in progress via the connection 4, for example from the control processor 3 to the host processor 2. Each frame 202 transmitted follows a data send primitive 201 ("DATA_REQ") produced within the processor 3.

At a given instant, the layer 11 of the HCI protocol sends a primitive 203 within the processor 2 signifying that the buffer memory for receiving the I frames is full. Such a situation may occur, for example, when the application 13 for which the data transported by the I frames are intended processes them with a bit rate lower than the bit rate of transmission of the connection 4 and than the bit rate of sending of the frames by the processor 3. The primitive 203 indicates that the processor 2 is not available to receive more than one additional I frame ("FLOW_REQ (BUSY)" type primitive).

Following the receipt by the processor 2 of an additional I frame, the processor 2 sends a frame 204 of S type carrying the following two messages: acknowledgement (ACK) of the last I frame received and indication of unavailability of the processor 2 (RNR standing for "Receiver Not Ready"). The acknowledgement is stipulated by the next I frame's index number indicated in bits 5 to 7 of the control field 24 of the S frame and by the "poll" value of bit 4. The unavailability of the processor 2 is indicated by bits 2 and 3 of the field 24. Furthermore, the second bit of the address field 23 of the frame 204 is used in the manner provided for by the HDLC standard to indicate that this frame possesses a response significance.

Following the receipt of the frame 202, a primitive 205 is produced within the processor 2 at the level of the HSTL layer 9b ("DATA_IND" primitive). Independently, a primitive 206 indicating unavailability of the processor 2 ("FLOW_IND (BUSY)") is produced within the processor 3 in response to the receipt of the frame 204. The processor 3 then suspends the dispatching of I frames via the connection 4, until the receipt of a message indicating that the processor 2 is again available.

The processor 2 then proceeds to the processing of the data contained in the I frames already received. After a specified duration $\Delta t_{FLOW}$, a primitive 207 internal to the processor 2 indicates that it is available again ("FLOW_REQ (NOT BUSY)"). According to the HSTL protocol of the invention, the processor 2 then transmits via the connection 4 a new S frame (208). This frame 208 again indicates the index number of the I frame following the frame 202 in the sequence of frames transmitted by the processor 3 to the processor 2, with a "poll" value of bit 4 of its control field. The frame 208 also contains an indication of availability (RR standing for "Receiver Ready") carried by bits 2 and 3 of the control field 24. In response to the receipt of the frame 208, the processor 3 produces a primitive 209 of type "FLOW_IND (NOT BUSY)" which triggers the resumption of the transmission of the I frames (210) from the processor 3 to the processor 2.

Figure 8:
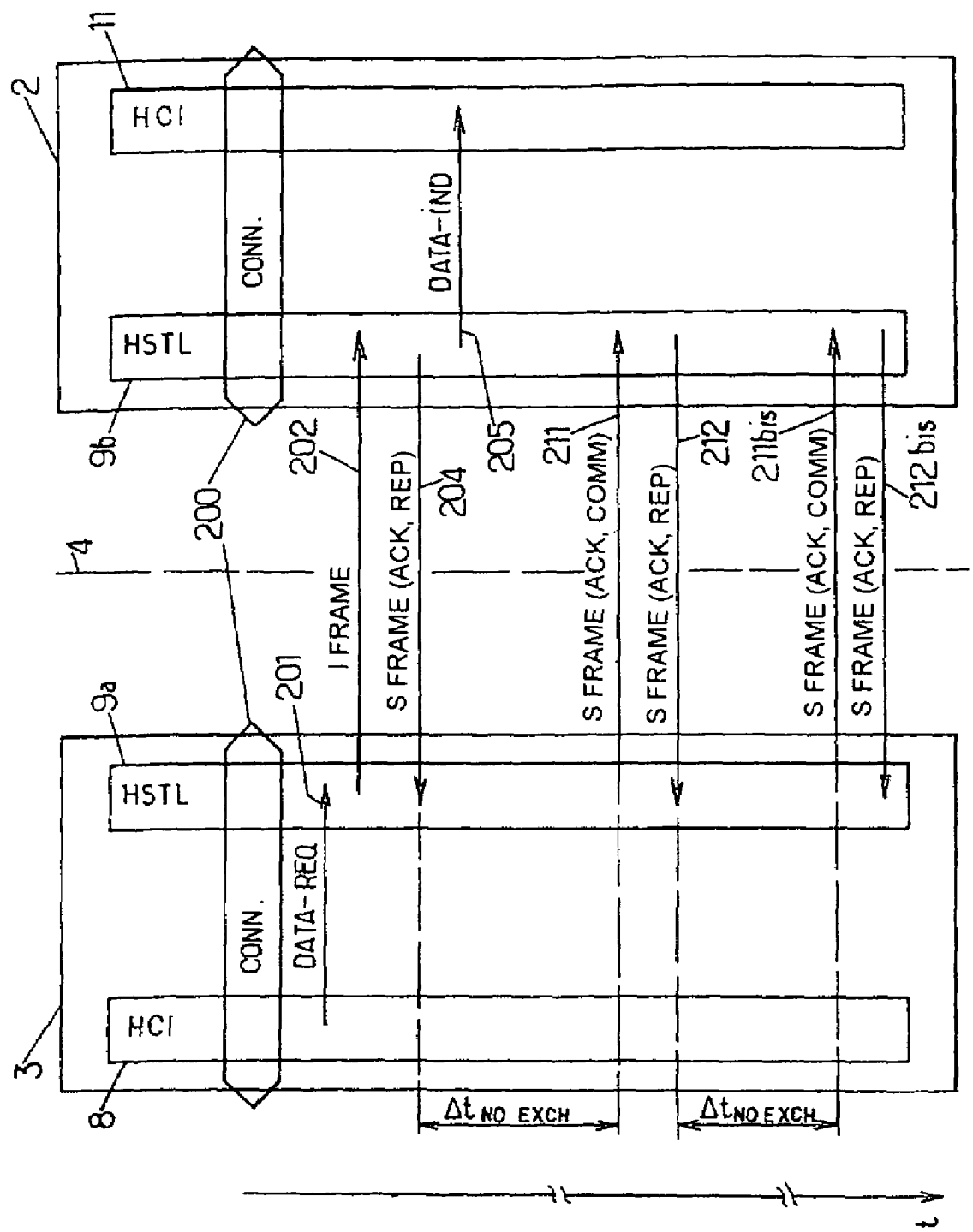
FIG. 8 illustrates various sequences of a transmission standby procedure according to the invention.

The chart of FIG. 8 corresponds to an evolution of the communication between the two processors, which is alternative to that of FIG. 7. This evolution corresponds to the situation according to which the processor 2 waits for data from the processor 3, which the latter is late in providing. S frames transmitted periodically via the connection 4 then make it possible to maintain the communication between the two processors in a standby state, while verifying the operation of the connection 4.

The initial state of the two processors and the start of the communication carried by the connection 4 that are indicated in FIG. 8 are the same as those of FIG. 7. The references 200, 201, 202 and 205 of FIG. 8 have identical meanings to those of FIG. 7.

The S acknowledgement frame (ACK) 204 which calls the next I frame is dispatched by the processor 2 in response to the frame 202. This response function (REP) is indicated by the second bit of the address field 23. Now, the data intended to be conveyed by the next I frame are not immediately available within the processor 3. After a standby time interval, designated $\Delta t_{NO}$ EXCH in FIG. 8, awaiting provision of these data, the processor 3 sends a frame 211 of S type destined for the processor 2. The frame 211 is identical to the frame 204, except that the second bit of the address field 23 is used to indicate that this frame possesses a command meaning ("COMM").

The processor 2 responds to the frame 211 by in its turn sending a frame 212. The frame 212 is obtained by the processor 2 from the frame 211 by changing the value of the second bit of the address field 23. The frame 212 thus possesses a meaning of response ("REP") to the frame 211. The exchanging of the frames 204, 211 and 212 makes it possible to verify the state of the communication between the processors at the level of the HSTL transport layers 9a and 9b, without involving the higher layers of each processor. The processor 3 can thus count on the state of availability of the connection 4 before sending the next I frame. It is informed in case of failure of the supervising sequence.

The sequence of dispatching of the frames 211 and 212 is repeated while the processor 3 cannot deliver a new I frame. Thus the processor 3 sends a frame 211b is identical to the frame 211 after a new time interval $\Delta t_{NO}$ EXCH running from the receipt of the frame 212. The processor 2 responds to the frame 211b is through a frame 212b is identical to the frame 212.

It is understood that the communication protocol which is the subject of the invention, designated HSTL hereinabove, may be supplemented with additional functions relative to those described earlier. The functions which have been described in detail are therefore not limiting, but constitute a core of inter-combined arrangements for ensuring a good level of quality of the communications between two processors.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of transmission between two processors arranged inside a radio communication unit and linked together by a connection internal to the radio communication unit, the first processor executing at least one application and the second processor executing radio communication operations between said unit and outside communication units, comprising:
    apportioning of codes by one of the two processors, the sender of said codes, into frames having respective lengths;
    writing of elements by the sending processor into dedicated fields of each frame, the elements comprising:
        the length of the frame,
        a value of an indicator of transmission error determined by the sending processor on the basis of certain at least of the codes placed in the frame, and
        a start of frame indicator and an end of frame indicator;
    transmitting of the frames by the internal connection;
    for each frame, verifying by the other processor, the receiver of said codes:
        the identity between the length of the frame received and the length written,
        the identity between the written value of the error indicator and a value of this error indicator as determined by the receiving processor on the basis of certain at least of the codes received in the frame, and
        the presence of the start and end of frame indicators;
    in the case of positive verifications, producing by the receiving processor of an acknowledgement message dispatched to the sending processor by the internal connection.

2. The method according to claim 1, further comprising by the receiving processor verifying that the start indicator of a second frame received just after a first frame, according to the chronological order of reception of the frames, is received after a specified separation time interval from the reception of the end indicator of said first frame.

3. The method according to claim 1, wherein the frames comprise at least one control field containing a code for distinguishing between several types of frames.

4. The method according to claim 1, further comprising:
    sending a frame via the internal connection in response to a primitive of a first type produced within the sending processor; and
    producing a primitive of a second type within the receiving processor in response to the reception of the frame by the internal connection.

5. The method according to claim 1, wherein the frame contains codes for requesting end of transmission by the internal connection, and is sent prior to an interruption of operation of the sending processor.

6. The method according to claim 5, wherein the codes for requesting end of transmission comprise codes indicating the state of the sending processor after the interruption of operation of the sending processor.

7. The method according to claim 1, wherein the value of the transmission error indicator is given by the remainder after dividing a polynomial constructed on the basis of certain at least of the codes contained in the frame by a generating polynomial.

8. The method according to claim 1, wherein the codes correspond to information contained in packets, and wherein the sending processor apportions the codes corresponding to the information of a packet into a single frame associated with said packet.

9. The method according to claim 8, wherein said packet is a data packet or a signaling packet.

10. The method according to claim 3, wherein the codes correspond to information contained in packets, the sending processor apportioning the codes corresponding to the information of a packet into a single frame associated with said packet, each packet being of a predefined type, and wherein the type of the frame associated with a packet is determined as a function of the type of the packet.

11. The method according to claim 10, wherein
    an I frame of the HDLC protocol is associated with a packet of data intended for or emanating from the application or a control packet,
    a UI frame of the HDLC protocol is associated with a packet transporting voice, and
    a U SABM, UA, DISC or DM frame is associated with the signaling of the communication.

12. The method according to claim 1, wherein an S frame of the HDLC protocol is used to send a message for supervising a transmission by the internal connection.

13. A processor including an interface for connecting another processor, comprising:
    means for producing frames containing codes apportioned into specified fields;
    means for determining the value of a transmission error indicator on the basis of certain at least of the codes placed in a frame;
    means for writing elements into dedicated fields of each frame, the elements including:
        a length of the frame,
        a specified value of the error indicator determined for the frame, and
        a start of frame indicator and an end of frame indicator;
    means for sending frames via said interface;
    means for receiving frames via said interface;
    means for measuring the length of a frame received;
    means for verifying in a frame received:
        an identity between the length measured of the frame received and the length written, an identity between the written value of the error indicator in the frame received and a value of this error indicator as determined on the basis of certain at least of the codes received in the frame, and a presence of the start and end of frame indicators;

means for producing acknowledgement messages devised so as to dispatch an acknowledgement message via said interface in response to a frame received validated by the verification means.

14. The processor according to claim 13, further comprising means for measuring a duration between the reception of the start indicator of a second frame received via said interface after a first frame, according to the chronological order of reception of the frames, and the reception of the end indicator of said first frame and, comprising means for verifying that said duration is greater than a specified separation time interval.

15. The processor according to claim 13, further comprising means for writing a type of frame code into at least one control field of each frame.

16. The processor according to claim 13, further comprising means for producing primitives, wherein the means for sending the frames via said interface are devised in such a way as to send a frame containing determined codes in response to a primitive of a first type produced within said processor, and wherein the means for producing primitives are devised so as to produce a primitive of a second type in response to a frame containing determined codes received by said interface.

17. The processor according to claim 13, wherein the means for sending the frames are devised so as to send via said interface a frame containing codes for requesting end of transmission prior to an interruption of operation of the processor.

18. The processor according to claim 17, wherein the means for sending the frames comprise means for introducing into the frame containing the codes for requesting end of transmission, codes indicating the state of the processor after the interruption of operation of the processor.

19. The processor according to claim 13, wherein the means for determining the value of the error indicator comprise means for calculating the remainder of dividing a polynomial constructed on the basis of certain at least of the codes contained in a frame by a generating polynomial.

20. The processor according to claim 13, wherein the codes correspond to information contained in packets, and wherein the means for apportioning the codes are devised so as to apportion the codes corresponding to the information of a packet into a single frame associated with said packet.

21. The processor according to claim 15, wherein the codes correspond to information contained in packets, the means for apportioning the codes being devised so as to apportion the codes corresponding to the information of a packet into a single frame associated with said packet, each packet being of a predefined type, and wherein the means for producing the frames are devised so as to associate with a packet a frame of specified type determined as a function of the type of the packet.

22. The processor according to claim 21, wherein the means for producing the frames are devised so as to associate an I frame of the HDLC protocol with a data packet, and so as to associate a U frame of the HDLC protocol with a signalling packet.

23. The processor according to claim 13, wherein the means for producing the frames are devised so as to produce an S frame of the HDLC protocol to send a message for supervising a transmission via said interface.

24. The processor according to claim 13, comprising means for executing an application, means for processing, according to said application, information corresponding to a part of the codes contained in frames received via said interface, and means for producing codes to be apportioned into frames using the information produced by said application.

25. The processor according to claim 13, comprising means for executing operations of radio communication with outside communication units, means for producing radio signals transmitted using a part of the codes contained in frames received via said interface, and means for producing codes to be apportioned into frames using the radio signals received.

26. A radio communication unit, comprising:

a first processor;

a second processor;

an internal interface interconnecting the first and second processors;

the first processor including:
means for executing an application; and
a communications protocol to transmit frames over, and receive frames from, the internal interface;

the second processor including:
means for executing operations of external radio communication; and
the communications protocol to transmit frames over, and receive frames from, the internal interface;

wherein the communications protocol at the first and second processor provides a security function by encapsulating processor packet data in the frame with at least one security field and decapsulating the frame to confirm correct receipt of the packet data by verifying security data in the at least one security field.

27. The radio communication unit according to claim 26, wherein the communications protocol at the first and second processor further transmits an acknowledgment message in response to a received and confirmed frame.

28. The radio communication unit according to claim 26, wherein the communications protocol at the first and second processor determines data for inclusion in the security field based at least in part on the processor packet data.

29. A method for inter-processor communication wherein a first and second processor are located within a communication unit and are interconnected by an internal interface, comprising:

encapsulating a communications packet originated by the first processor in a secure frame which includes a data field containing the communications packet and at least one security field containing security data derived at least in part from the encapsulated communications packet;

transmitting the secure frame over the internal interface to the second processor;

decapsulating the secure frame by the second processor to recover the at least one security field containing security data and the data field containing the communications packet;

verifying the security data to confirm correct receipt of the communications packet; and sending of an acknowledgment from the second processor to the first processor over the internal interface in response to the verification.

30. The method according to claim 29, wherein the at least one security field comprises a length field containing data indicative of a length of the secure frame which encapsulates the communications packet, and wherein verifying comprises checking that a length of the received secure frame matches the length in the length field.

31. The method according to claim 29, wherein the at least one security field comprises an error detection field containing redundancy check data for the secure frame which encapsulates the communications packet, and wherein verifying comprises checking that redundancy check data calculated for the received secure frame matches the redundancy check data contained in the error detection field.

32. The method according to claim 29, wherein encapsulating further comprises providing the secure frame with a start of frame and an end of frame indicator, and further comprising:
  decapsulating the secure frame by the second processor to recover the start of frame and end of frame indicators;
  verifying that the start of frame and end of frame indicators are present; and
  sending of the acknowledgment from the second processor to the first processor over the internal interface in response to the verification.

33. The method according to claim 29, wherein the second processor receives consecutive first and second secure frames, and further comprising:
  measuring a time interval between the first and second secure frames;
  verifying that the time interval exceeds a threshold; and
  sending of the acknowledgment of the second secure frame from the second processor to the first processor over the internal interface in response to the verification.

34. A communication unit, comprising:
  a first and second processor located within the communication unit;
  an internal interface interconnecting the first and second processors;
  wherein the first processor includes a communications protocol to:
    encapsulate a communications packet in a secure frame which includes a data field containing the communications packet and at least one security field containing security data derived at least in part from the encapsulated communications packet; and
    transmit the secure frame over the internal interface to the second processor; and
  wherein the second processor includes a communications protocol to:
    decapsulate the secure frame to recover the at least one security field containing security data and the data field containing the communications packet;
    verify the security data to confirm correct receipt of the communications packet; and
    send an acknowledgment to the first processor over the internal interface in response to the verification.

35. The unit according to claim 34, wherein the at least one security field comprises a length field containing data indicative of a length of the secure frame which encapsulates the communications packet, and wherein the second processor communications protocol verification checks that a length of the received secure frame matches the length in the length field.

36. The unit according to claim 34, wherein the at least one security field comprises an error detection field containing redundancy check data for the secure frame which encapsulates the communications packet, and wherein the second processor communications protocol verification checks that redundancy check data calculated for the received secure frame matches the redundancy check data contained in the error detection field.

37. The unit according to claim 34, wherein the first processor communications protocol encapsulation further provides the secure frame with a start of frame and an end of frame indicator, and wherein the second processor communications protocol:
  decapsulates the secure frame to recover the start of frame and end of frame indicators;
  verifies that the start of frame and end of frame indicators are present; and
  sends the acknowledgment to the first processor over the internal interface in response to the verification.

38. The unit according to claim 34, wherein the second processor receives consecutive first and second secure frames, and the second processor communications protocol further:
  measures a time interval between the first and second secure frames;
  verifies that the time interval exceeds a threshold; and
  sends the acknowledgment of the second secure frame to the first processor over the internal interface in response to the verification.

39. The unit according to claim 34, wherein the communications protocol used by the first and second processors comprises a transport level protocol.

40. The unit according to claim 39, wherein the transport level protocol is host controller interface secure transport layer protocol.

* * * * *